United States Patent Office 2,952,082
Patented Sept. 13, 1960

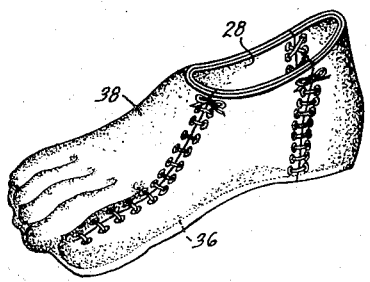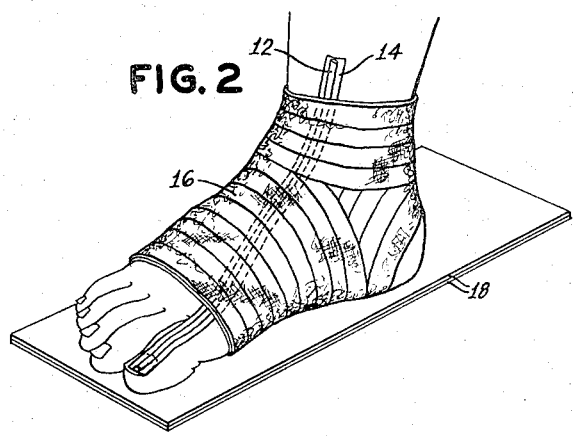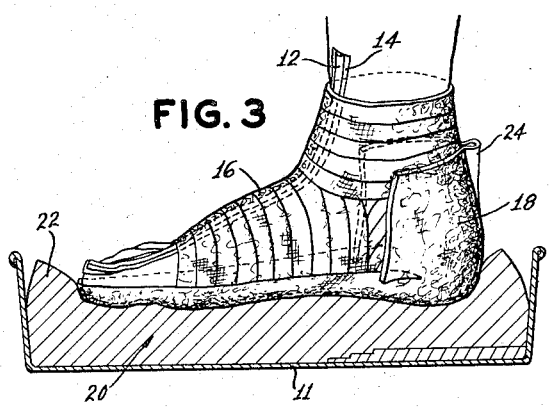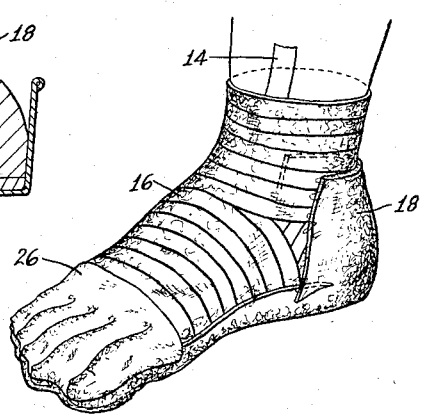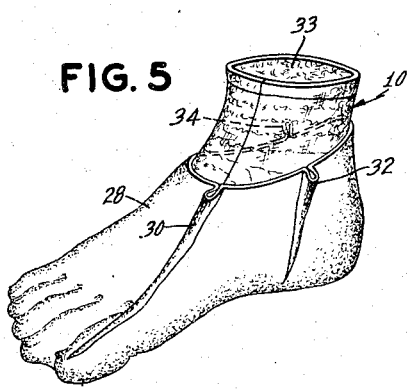

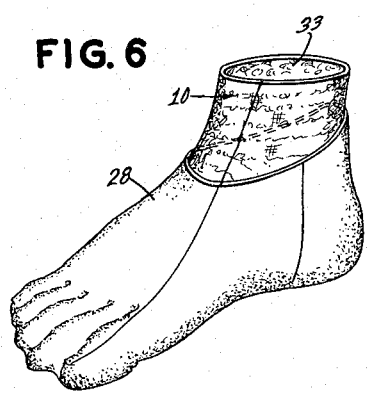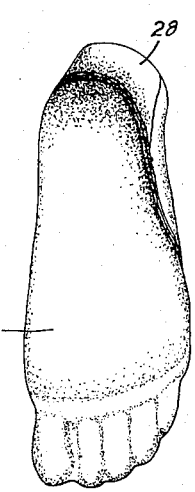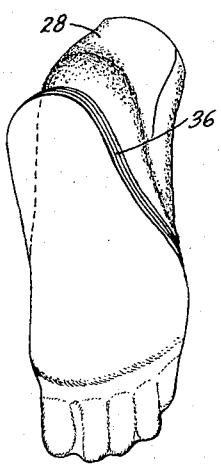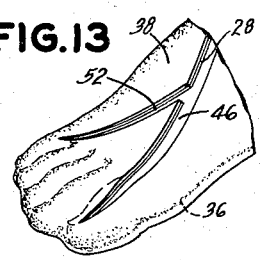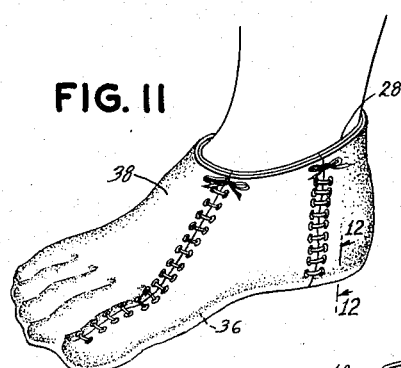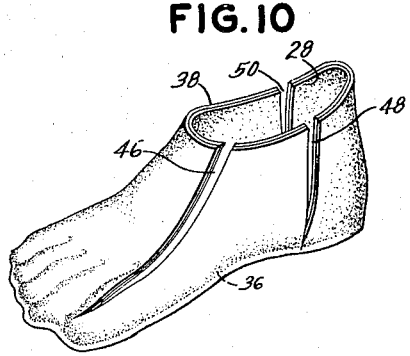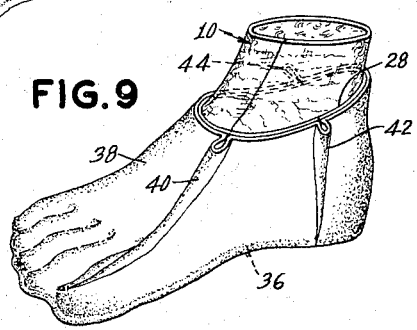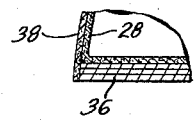

2,952,082

MOLDED SHOE

Alan E. Murray, 844 Colorado Ave., Bridgeport 5, Conn.

Filed Dec. 20, 1957, Ser. No. 704,169

6 Claims. (Cl. 36—8.5)

This invention relates to an improvement in the structure of shoes molded to fit the individual contours of the feet.

The manufacture of molded shoes of the type to which this invention relates was first described by me in United States Letters Patent No. 2,332,000. As there described a cast of the individual's feet is taken and then lasts are made upon which the shoes are built. The shoes are built by applying moldable materials such as fabric and leather wet with liquid rubber latex in uncured form to the lasts and these materials are very carefully and exactly molded on the foot lasts so that the finished shoe faithfully follows the contours of the individual's feet.

Making a last of the individual's feet that accurately reproduces the natural posture and volume that the foot assumes while walking is one of the most important and difficult operations in the manufacture of molded shoes. In my copending application Mold Shell Adapted for Use in the Manufacture of Molded Shoes and Method of Making Same Serial No. 704,170 filed under even date herewith I describe a new and novel type last which tremendously simplifies manufacture of molded shoes and the shoes made with the last of my copending application have proven very accurately to conform to the natural contours and volume which the foot assumes while walking.

The last described in my copending application is formed by coating the foot with a moldable material adapted to set and form a permanent impression of the foot therein. After the last is set to the extent that it will retain the impression of the foot the wall of the last is slit open and the foot is then removed from the hollow last. Thereafter a strip of material is cut out of the wall of the last throughout the length of the slit. The edges of the resulting slot are then brought together in face to face contact to close the last and reduce its volume. A plaster of Paris coating or other strengthening material is applied to the interior wall of the last in order to hold the last in closed position and give it the strength required to withstand the subsequent shoe making processes. Molded shoes are then built up on the exterior surface of the last.

Many outstanding advantages are achieved with the hollow last of my invention and foremost among these is the fact that molded shoes built up on the hollow last fit the foot quite snugly giving positive containment to the tissue of the foot while maintaining the natural weight bearing posture of the digital region of the metatarsal arch.

Reducing the volume of the last is a very critical and important step which makes it possible to build a molded shoe on the exterior of the last.

In accordance with the present invention I have found that the required reduction in volume can be achieved right in the structure of the molded shoe itself without losing any of the beneficial results of the last of my copending application. To this end I employ the last of my copending application just as it comes from the foot without any reduction in volume and then I build a molded shoe up on the last by applying moldable materials such as fabric and leather wet with liquid rubber latex in uncured form to the last. The molded shoe may be built up on the last as described in my issued U.S. Patent No. 2,332,000 or by any other convenient method. After the moldable materials in the finished shoe have set to the extent of retaining an impression of the foot therein I open the upper of the molded shoe by slitting it in three different places. The first slit is positioned in the front wall of the shoe and it runs from the opening in the top of the upper down to the tip of the toe. The next two slits are positioned opposite each other in the side wall of the shoe between the ankle joint and Achilles tendon and the slits run from the rim of the opening in the top of the shoe down to the level of the inner sole of the shoe. After the molded shoe is slit it is carefully removed from the last and then a strip of material about ⅛ inch wide is cut out of the side wall of the shoe along the side of each of the slits. Laces are provided for the slits so that the slits may be drawn together and the volume of the upper reduced to provide a snug fit against the foot.

Reduction of the volume of the upper of the shoe in this way does not appreciably disturb the natural posture or relationship of different parts of the shoe and the natural shape of the metatarsal arch in the digital region of the foot which has been built into the inner sole of the shoe is exactly preserved just as prescribed by nature. Slitting the front wall of the shoe as well as the side wall as described is important in order to preserve the relationship of different parts of the shoe. Reduction of volume in local areas of the upper of the shoe by means of a minimum of three separate slits is an extremely important feature of the present invention. Otherwise the upper of the shoe would be distorted and the natural relationship of the different parts of the shoe destroyed when the volume is reduced to the extent required to form a snugly fitting shoe.

Details of the structure of the molded shoe of the present invention are best understood by reference to the accompanying drawings in which:

Fig. 1 illustrates the molded shoe of my invention.

Fig. 2 shows a foot with the last of my invention being formed thereon.

Fig. 3 illustrates one way in which plaster of Paris bandage splints may be molded to the bottom of the foot and last of Fig. 2.

Fig. 4 shows the finished plaster last in place on the foot.

Fig. 5 illustrates the first step in forming a molded shoe on the last of my invention.

Fig. 6 illustrates the molded shoe of Fig. 5 with tucks of excess material cut away.

Fig. 7 illustrates the application of a ground sole to the molded shoe of Fig. 6.

Fig. 8 shows a bottom view of the ground sole of Fig. 7 in place on the molded shoe.

Fig. 9 illustrates the way in which the outer leather coating is applied to the molded shoe of Fig. 8.

Fig. 10 illustrates the way in which slots are positioned in the upper of the molded shoe of Fig. 9.

Fig. 11 illustrates the way in which the slots are used to reduce the volume of the molded shoe of Fig. 9.

Fig. 12 is a sectional view taken on the line 12—12 of Fig. 11; and

Fig. 13 illustrates the shoe of Fig. 10 with an additional slot positioned in the upper for added reduction of volume.

For the purpose of illustration, I describe a very simple form of molded shoe built up on the exterior of a hollow shoe last 10 made in accordance with the teaching of my copending application filed under even date herewith and entitled Molded Shell Adapted for Use in the Manufacture of Molded Shoes and Method of Making Same. In forming the last a rubber or, other suitable cord 12, about ⅛" in diameter is attached to the back of a strip of adhesive tape 14 by any convenient means and the tape is then positioned on the foot. The tape preferably follows along the top of the foot to the ankle region thereof (Fig. 2). As later described the rubber cord provides a small ridge in the last so that the point of a pair of shears may be readily inserted into the last when it is cut open to remove the foot.

A roll of plaster of Paris bandage is first thoroughly wet with water and then the bandage wrap 16 is started at the ball of the foot in a line behind the cavities under the toes so that the natural position of the toes and metatarsal arch in the digital region of the foot will not be disturbed. As best shown in Fig. 2 of the drawings, the plaster bandage wrap ends immediately above the ankle and the end of the plaster bandage is attached to the wrap by any convenient means. The turns of the wrap are applied in a spiral in overlapping relationship in customary manner so that the skin will not bulge out between adjacent turns. During application the bandage strip is held taut so that the turns will fit snugly against the foot and after the wrap is completed it is pressed in firmly against the foot by hand. Since the wrap is started in a line across the ball of the foot there is no danger of pulling the toes together into crowded position which would destroy the natural posture of the metatarsal arch in the digital region of the foot.

The next step involves molding a thin shell over the toes and exposed portion of the front of the foot and great care is taken to preserve the natural position of the toes and metatarsal arch. This is most conveniently done by applying two wet plaster of Paris bandage splints 18 against the bottom of the wrap and exposed portion of the front of the foot (Fig. 2). The splints are trimmed to provide a margin extending out about one-half to one inch beyond the periphery of the foot so that the margin may be molded up against the curved portion of the foot without overlapping the top surface of the front of the foot.

In order to mold the plaster splints 18 to intimately conform to the contours of the bottom of the foot I prefer to place the foot in weight bearing condition against the top surface of a cushioning material which is adapted to apply back pressure against the bottom of the plaster splints and mold them up against the bottom surface of the foot. A convenient form of cushioning material 20 is illustrated in Fig. 3. The cushioning material shown comprises a plurality of layers 22 of dry terry cloth fabric material placed one on top of the other in a pan 11 to form a laminated pile. The bottom layers of terry cloth extend over only about one half the length of the pile and these layers are staggered to provide the desired heel heighth for the foot.

The foot with splints 18 on the bottom thereof is placed in weight bearing condition on top of the pile of cushioning material 20 and then the margin of splints 18 is carefully molded up against the curved portion at the side of the foot and the rear margin is molded up against the heel. In molding the rear portion up against the heel a tuck or fin 24 is formed to take care of excess material and after the molding is completed the fin is trimmed off even with the surface of the last. Two wet plaster of Paris bandage splints 26 are next applied over the exposed front portion of the foot and then the plaster splints are very carefully molded by hand down against the tops of the toes and into the gaps between the toes (Fig. 4). After the splints 26 have been molded to conform to the contours of the toes the sides and front portion are trimmed off to leave a margin of about one-half inch so that the sides and front portion of splints 26 may be molded down to overlap the margin of splints 18 which cover the bottom portion of the foot. During the molding operation it is extremely important to avoid crowding the toes together which would destroy the natural posture of the toes and metatarsal arch at the front of the foot. This completes the last and the foot is preferably maintained in weight bearing condition on top of the cushioning material 20 until the plaster last has set sufficiently to maintain an impression of the foot therein. Thereafter rubber cord 12 is removed from the last by pulling upwardly on the exposed end portion thereof and then the point of a pair of shears is inserted into the hollow left by the rubber cord and the last is slit down along the line of the rubber cord ending at the top of the big toe. The last is now gently spread apart and the foot is removed (not shown). The opposite side edges of the slit are now brought into face to face contact. In order to strengthen the hollow last I prefer to pour a liquid slurry of plaster of Paris into the last in an amount sufficient to give a thin coating 33 over the interior wall thereof. A uniform coating on the interior wall of the last is most conveniently achieved by placing the hand over the opening at the top of the last and then the last may be quickly revolved in small circles and tipped up and down to distribute the plaster coating uniformly over the interior wall of the last. The finished last is then set aside preferably with rubber bands (not shown) around it so that it will maintain its shape until the plaster has set and hardened.

After the last is hard a molded shoe is built up on the exterior of the last just as it comes from the foot without any reduction in volume. This may be conveniently done by first thoroughly impregnating a piece of leather 28 with liquid rubber latex in uncured form. The liquid rubber latex may be prepared as described in my U.S. Patent No. 2,332,000 or by any other convenient means. Preferably the leather is soaked in the latex and then the leather is worked to insure throrough impregnation thereof. The impregnated leather is then carefully molded by hand against the bottom surface of the last with the smooth side of the leather against the exterior of the last (Fig. 5). Care is taken to mold the leather up into the pyramid under the toes and into the channels between each of the individual toes. Thereafter the leather is carefully shaped down against the sides and over the top of the front of the last. For ease of illustration the last is shown with the foot in natural walking position, but it will be understood that in accordance with usual commercial practice the last will be inverted with the sole on top while the shoe is built up on the last. Excess leather caused by shaping it against the foot last is gathered together in convenient spots and the excess is snipped off. For example, excess leather in the sides and top portion of the shoe may be gathered together in three tucks. The first tuck 30 is preferably gathered together in a line extending from the tip at approximately the middle of the big toe along up the ridge line that runs along the top front portion of the foot. The second two tucks 32 and 34 respectively may be positioned opposite each other in the rear portion of the side wall of the shoe. Leather 28 is now carefully smoothed out against the contours of the last and thereafter the tucks or fins are cut off even with the surface of the leather and the opposite side edges of the leather where the tucks are cut off are drawn together by hand molding (Fig. 6). The liquid rubber latex by this time will have set up sufficiently to maintain the leather covering in its molded position on the shoe last. The piece of leather 28 is preferably applied so that one edge of the piece is started at the line of one of the rear tucks 32 or 34 so that the opposite edge of the strip will meet the first edge at the line of one of the tucks in the rear of the shoe.

A ground sole 36 for the shoe is now prepared. This may be done by saturating a plurality of layers of terry cloth fabric material with liquid rubber latex in uncured form. As in the case of the leather piece the latex is worked into the pores of the fabric material to insure impregnation thereof. The layers of latex impregnated terry cloth fabric material are now carefully molded against the sole portion of the leather on the shoe last (Fig. 7) and again care is taken to work the terry cloth sole into the pyramid and channels between the toes of the foot (Fig. 8). Three to four layers of terry cloth material provide an adequate outer sole for the shoe, but if desired an additional rubber sole may be applied against the exposed surface of the terry cloth sole. After the terry cloth sole has been molded on the last it is carefully trimmed off following the periphery of the bottom of the shoe last. The liquid rubber latex is now allowed to set until the sole is sufficiently rigid to maintain a permanent impression of the bottom of the foot therein.

A second piece of leather 38 cut to fit the upper portion of the molded shoe on the last is now thoroughly impregnated with liquid rubber latex in uncured form and the piece is carefully molded by hand against the terry cloth sole 36 and leather upper 28 (Fig. 9). Preferably one edge of the strip is started at the line of one of the rear tucks 32 or 34 so that the opposite side edges of the strip will come together at the line of a tuck. The leather is preferably applied with the smooth side on the outside of the shoe and after the leather is applied to the last it is carefully worked by hand to conform to the contours of the last. The excess material in the piece of leather 38 may be gathered together in the front directly over the line of tuck 30 to form a second tuck 40 and in the rear the excess leather may be gathered together to provide a pair of tucks 42 and 44 which correspond to the line of the tucks 32 and 34 respectively. The excess material in the tucks is then trimmed off and the excess leather that projects beyond the level of the ground sole is also trimmed off even with the surface of the ground sole (Fig. 12). The shoe is then worked and molded by hand to make it fit the last like a glove. The liquid rubber latex is allowed to set and harden until the upper is capable of retaining a permanent impression of the foot therein and then the molded shoe is gently spread apart at the lines of the tucks and carefully removed from the last. A strip of material about one-eighth to one-half inch in width is now trimmed away from each of the slits formed by trimming away the tucks so that three slots are formed in the side wall of the shoe as indicated at 46, 48 and 50 (Fig. 10). Thereafter holes for laces are positioned in the slots. Laces are then threaded through the holes and the shoe is placed on the wearer's foot and the laces tightened until the upper of the shoe makes a skin tight fit with the foot. The shoe is then set aside and allowed to dry until the liquid rubber latex is completely set.

The great advantage of molded shoes made in accordance with my invention is that the natural position of the toes and digital region of the metatarsal arch is exactly reproduced in the finished shoe and by reducing the volume of the upper of the shoe as herein described it is possible to build up a molded shoe on the exterior surface of a hollow foot last which is made right in place on the foot.

The location of the three slots 46, 48 and 50 for reducing the volume of the shoe is important. The front slot 46 must be positioned in the wall at the front of the shoe. Best results are achieved by positioning the front slot 46 along the top of the ridge line that runs down the front of the foot and this slot is preferably extended out over the top of the big toe to the tip thereof. The two rear slots are located in the side wall of the shoe in the area between the ankle joint and Achilles tendon. In all cases the slots extend from the rim of the opening at the top of the shoe down to the level of the inner sole. If desired additional slots may be cut into the upper and as illustrated in Fig. 13 I have found that a slot 52 positioned in the front wall of the shoe along the line extending from the base of the big toe out to the top of the little toe may be used if a better fit is desired in the front wall of the shoe. Additional slots may also be positioned in the side wall of the shoe but in all cases the maximum combined width of the slots in a side wall of the shoe will not be more than about one inch as measured along the line of the top of the inner sole of the shoe. Best results are achieved by making the slots about one-quarter to one-half inch wide and the slots extend from the top down to the level of the inner sole at the bottom of the side wall of the shoe. Since volume reduction at the level of the inner sole is at a minimum the slots may be made to taper down to a point at the inner sole. While a particular form of foot last and molded shoe are described as a preferred embodiment of my invention it will be understood that the foot last may be made in any convenient manner as long as the hollow last is made up right on the foot and of course the hollow last must be so constructed that it is possible to build up a molded shoe made of leather, fabric, or other moldable materials, on the exterior surface thereof. The molded shoe may be made by any convenient means and the layers in the upper of the shoe need not be a single piece of leather as described but may be made up of a plurality of pieces which may be butted together or joined with a simple overlap seam.

It will be understood that I intend to cover all changes and modifications of the preferred form of the invention herein chosen for the purpose of illustration which do not constitute departures from the spirit and scope of my invention.

What I claim is:

1. A molded shoe having at least three slots positioned in the upper of the shoe, one of said slots being located in the front wall of the shoe, and each of the other two slots being positioned in one side wall of the shoe in the area between the ankle joint and Achilles tendon and separate means associated with each of said slots for narrowing the opening of the slot to a selected width and maintaining opposite edges of the slot in spaced relationship corresponding to the selected width to reduce the volume of the upper of the shoe said shoe having a continuous unitary counter section extending across the Achilles tendon portion of the heel of the foot.

2. A structure as specified in claim 1 in which the slots extend from the opening at the top of the shoe down to the level of the inner sole thereof.

3. A structure as specified in claim 1 in which the slot in the front wall of the shoe follows the ridge line of the front of the foot from the opening at the top thereof down to the top of the big toe.

4. A structure as specified in claim 3 in which a fourth slot is positioned in the front wall of the shoe which extends from the little toe across the top of the foot to intersect said slot in the front wall of the shoe extending from the top of the big toe up to the opening at the toe of said shoe.

5. A molded shoe having three slots positioned in the upper of the shoe, one of said slots being located in the front wall of the shoe in a line extending from the top of the big toe up to the opening at the top of said shoe, and each of the other two slots being positioned in one side wall of the shoe in the area between the ankle joint and Achilles tendon, a fourth slot in the shoe which is positioned in the front wall along a line from the little toe across the top of the foot to intersect with approximately the half-way point of said slot in the front wall of the shoe extending from the top of the big toe up to the opening at the top of said shoe, means associated with each of the said slots for narrowing the opening of the slot to a selected width and for maintaining opposite edges of the slot in spaced relationship corresponding to the selected width, said shoe having a continuous unitary counter section extending across the Achilles tendon portion of the heel of the foot.

6. A molded shoe having a plurality of slots positioned in the upper of the shoe, one of said slots being located in the front wall of the shoe in a line extending from the top of the big toe up to the opening at the top of said shoe, and one half of the remainder of said slots being located in each side wall of the shoe, at least one of said slots in each side wall of the shoe being located in the area between the ankle joint and the Achilles tendon and the combined width of all slots in each side wall of the shoe as measured along the line of the top of the inner sole of the shoe being not more than about one inch, and means associated with each of said slots for narrowing the opening of the slot to a selected predetermined width and for maintaining opposite edges of the slot in spaced relationship corresponding to the selected width to reduce the volume of the upper of the shoe.

References Cited in the file of this patent

UNITED STATES PATENTS

| | | |
|---|---|---|
| 2,332,000 | Murray | Oct. 19, 1943 |
| 2,420,239 | Hack | May 6, 1947 |
| 2,530,737 | Sherwin et al. | Nov. 21, 1950 |
| 2,668,304 | Murray | Feb. 9, 1954 |
| 2,714,770 | Murray | Aug. 9, 1955 |